US 11,148,725 B2

(12) United States Patent
Singh

(10) Patent No.: US 11,148,725 B2
(45) Date of Patent: Oct. 19, 2021

(54) B-PILLAR WITH TAILORED PROPERTIES

(71) Applicants: MAGNA INTERNATIONAL INC., Aurona (CA); Jaswinder Pal Singh, Shelby Township, MI (US)

(72) Inventor: Jaswinder Pal Singh, Shelby Township, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 225 days.

(21) Appl. No.: 16/089,473

(22) PCT Filed: Mar. 26, 2017

(86) PCT No.: PCT/US2017/024200
§ 371 (c)(1),
(2) Date: Sep. 28, 2018

(87) PCT Pub. No.: WO2017/172546
PCT Pub. Date: Oct. 5, 2017

(65) Prior Publication Data
US 2019/0106155 A1    Apr. 11, 2019

Related U.S. Application Data

(60) Provisional application No. 62/314,764, filed on Mar. 29, 2016.

(51) Int. Cl.
*B62D 25/04* (2006.01)
*B29C 71/02* (2006.01)
*B62D 29/00* (2006.01)
*C21D 1/673* (2006.01)
*C21D 1/34* (2006.01)
(Continued)

(52) U.S. Cl.
CPC .............. *B62D 25/04* (2013.01); *B29C 71/02* (2013.01); *B62D 29/007* (2013.01); *C21D 1/34* (2013.01);
(Continued)

(58) Field of Classification Search
CPC ....... B62D 25/04; B62D 29/007; B62D 65/02
(Continued)

(56) References Cited

U.S. PATENT DOCUMENTS 8,684,449 B2 * 4/2014 Bodin .................... B62D 25/04
296/193.06
2004/0201256 A1 * 10/2004 Caliskan .................. F16F 7/12
296/187.08
(Continued)

FOREIGN PATENT DOCUMENTS

CN          103209780 A     7/2013
CN          104494704 A     4/2015
(Continued)

*Primary Examiner* — D Glenn Dayoan
*Assistant Examiner* — Sunsurraye Westbrook
(74) *Attorney, Agent, or Firm* — Dickinson Wright PLLC

(57) ABSTRACT

A dimensionally stable B-pillar for an automotive vehicle including tailored material properties is provided. The B-pillar includes at least one localized soft zone surrounded by a hard zone. The hard zone typically has a yield strength of 950 MPa to 1700 MPa; a tensile strength of 1200 MPa to 2100 MPa; and an elongation of greater than 4%. The soft zones each have a yield strength of 340 MPa to 780 MPa; a tensile strength of 400 MPa to 980 MPa; and an elongation of greater than 10%. The microstructure of the hard zone is martensite, and the microstructure of the soft zones is tempered martensite, ferrite pearlite bainite, ferrite pearlite austenite, ferrite pearlite, ferrite bainite, cementite austenite, and/or cementite bainite. The soft zones of the B-pillar are manufactured with a slow cooling step, which can be conducted in air outside of the dies.

16 Claims, 7 Drawing Sheets

(51) Int. Cl.
*B29C 35/16* (2006.01)
*B29C 35/04* (2006.01)
*B29C 35/08* (2006.01)

(52) U.S. Cl.
CPC .............. *C21D 1/673* (2013.01); *B29C 35/16* (2013.01); *B29C 2035/043* (2013.01); *B29C 2035/0811* (2013.01); *B29C 2035/0822* (2013.01); *B29C 2035/0838* (2013.01); *B29C 2071/022* (2013.01); *B29C 2071/027* (2013.01); *C21D 2211/008* (2013.01); *C21D 2221/00* (2013.01)

(58) Field of Classification Search
USPC .................. 296/193.01, 193.06, 203.03, 209; 148/529, 400, 516, 526; 288/160, 173.1, 288/262.4; 266/111, 160, 249
See application file for complete search history.

(56) References Cited

U.S. PATENT DOCUMENTS

| | | |
|---|---|---|
| 2007/0261769 A1 | 11/2007 | Bodin |
| 2011/0214786 A1 | 9/2011 | Loecker et al. |
| 2011/0233970 A1* | 9/2011 | Nagai .................... B62D 25/02 296/203.03 |
| 2011/0266836 A1* | 11/2011 | Heo ...................... B62D 21/157 296/193.06 |
| 2012/0006089 A1* | 1/2012 | Pohl ..................... C21D 8/0205 72/364 |
| 2012/0186705 A1* | 7/2012 | Sikora .................... B21D 37/16 148/516 |
| 2013/0180633 A1 | 7/2013 | Lee et al. |
| 2014/0191536 A1 | 7/2014 | Elfwing et al. |
| 2014/0191563 A1 | 7/2014 | Elfwing et al. |
| 2015/0147111 A1 | 5/2015 | Teague |

FOREIGN PATENT DOCUMENTS

| | | |
|---|---|---|
| CN | 104527804 A | 4/2015 |
| CN | 104590385 A | 5/2015 |
| DE | 102015203644 A | 9/2016 |
| EP | 1799871 A1 | 6/2007 |
| EP | 2883967 A1 | 6/2015 |
| WO | 2017103138 A1 | 6/2017 |

* cited by examiner

B-PILLAR WITH TAILORED PROPERTIES

CROSS REFERENCE TO RELATED APPLICATION

This U.S. National Stage Patent Application claims the benefit of PCT International Patent Application Serial No. PCT/US2017/024200 filed Mar. 26, 2017 entitled "B-Pillar With Tailored Properties" which claims the benefit of and priority to U.S. Provisional Patent Application Ser. No. 62/314,764, filed Mar. 29, 2016, the entire disclosures of the applications being considered part of the disclosure of this application, and hereby incorporated by reference.

BACKGROUND OF THE INVENTION

1. Field of the Invention

The invention relates generally to structural components for automotive vehicles, more particularly to B-pillars formed of steel, and methods of manufacturing the same.

2. Related Art

High strength structural components formed of steel for automotive vehicles, such as B-pillars, can be designed with tailored material properties to meet crash standards set by the automotive industry. However, such B-pillars oftentimes experience unstable dimensions due to the production process, and thus do not fit well in a body-in-white assembly. Any distortion of the desired dimensions could lead to poor sealing along the surface and/or trim of the B-pillar, which in turn could increase noise, vibration, and harshness (NVH), as well as corrosion during use of the B-pillar in the automotive vehicle. The B-pillar is typically scrapped if it has a certain amount of distortion or dimensional issues.

To reduce distortion, the production process can include holding the B-pillar between a pair of heated die for a long cooling step. However, some distortion could still occur. In addition, the cooling time required to reduce distortion of the B-pillar increases the total production cycle time, which is not desirable.

SUMMARY

A B-pillar for an automotive vehicle having tailored material properties and which is dimensionally stable is provided. The B-pillar comprises a component including a hard zone and at least one soft zone. The at least one soft zone has a volume less than a volume of the hard zone.

A method of manufacturing the B-pillar is also provided. The method includes heating a blank, and cooling at least one area of the blank at a slower rate than a remaining area of the blank to form at least one soft zone and a hard zone. The at least one soft zone has a volume less than a volume of the hard zone.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE EXAMPLE EMBODIMENTS

Figure 1:
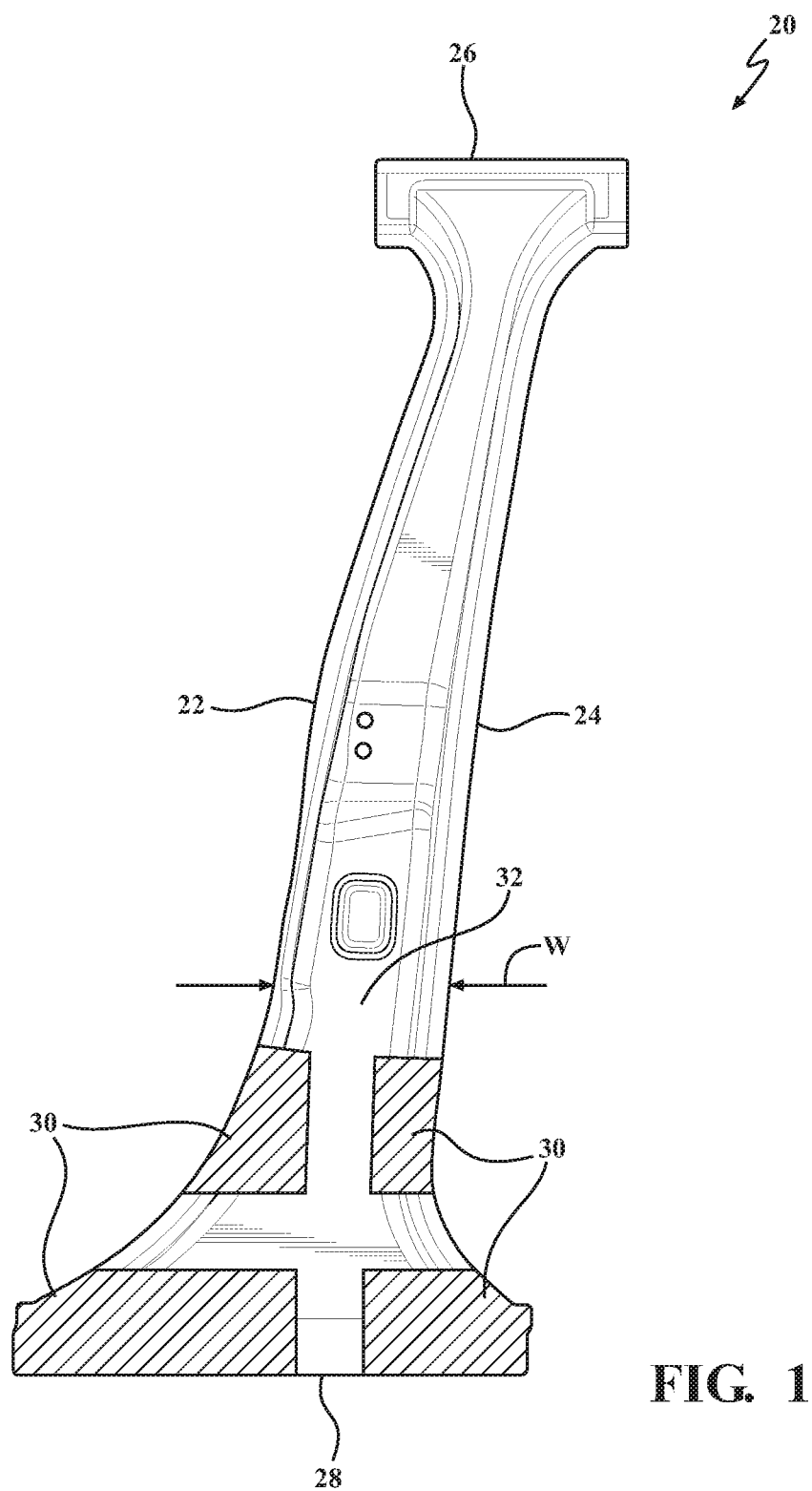
FIGS. 1-7 each illustrate a B-pillar including localized soft zones surrounded by a hard zone according to example embodiments.

The invention provides a structural component, specifically a B-pillar 20 for an automotive vehicle having customized tailored material properties which is dimensionally stable and can meet crash standards. The composition and manufacturing process used to form the B-pillar 20 provide dimensional stability. Thus, the B-pillar 20 can fit well in a body-in-white assembly, and poor sealing or distortion that leads to scrapping the B-pillar 20 is avoided.

Examples of the B-pillar 20 are shown in FIGS. 1-7. The B-pillar 20 includes a forward side edge 22 and a rear side edge 24 each extending longitudinally from a top end 26 to a bottom end 28. The B-pillar 20 has a width w extending from the forward side edge 22 to the rear side edge 24, and the width w of the B-pillar 20 of the example embodiments varies between the top end 26 and bottom end 28. However, the B-pillar 20 can comprise various different shapes and dimensions. The B-pillar 20 has stable dimensions along its surface, ends 26, 28, and side edges 22, 24 or trim and thus can provide the sealing required to meet noise, vibration, and harshness (NVH) standards as well as good corrosion resistance during use of the B-pillar 20 in an automotive vehicle.

The B-pillar 20 has tailored material properties which can meet crash standards, including a side impact standard (IIHS FMVSS 214) and roof crush standard (FMVSS 216). The tailored material properties are provided by at least one soft zone 30 surrounded by a hard zone 32. The hard zone 32 has a higher yield strength and higher tensile strength than the at least one soft zone 30. The hard zone 32 also has a lower elongation than the at least one soft zone 32. In the example embodiments, the hard zone 32 has a yield strength of 950 MPa to 1700 MPa; a tensile strength of 1200 MPa to 2100 MPa; and an elongation of greater than 4%. Also in example embodiments, the soft zone or soft zones 30 each have a yield strength of 340 MPa to 780 MPa; a tensile strength of 400 MPa to 980 MPa; and an elongation of greater than 10%.

The B-pillar 20 is formed of an iron-based material, such as steel. The microstructure of the hard zones 32 and the microstructure of the at least one soft zone 30 differ to achieve the desired performance. In the example embodiments, the hard zone 32 has a martensitic microstructure. The microstructure of the soft zones 30 can vary and still meet the crash standards. Typically, the microstructure of the at least one soft zone 30 includes at least one of tempered martensite, ferrite, pearlite, bainite, austenite, and cementite. For example, the microstructure of the at least one soft zone 30 can include tempered martensite, ferrite pearlite bainite, ferrite pearlite austenite, ferrite pearlite, ferrite bainite, cementite austenite, and/or cementite bainite.

The size and number of the soft zones 30 can vary depending on the desired performance of the B-pillar 20. However, the one or more soft zones 30 are localized, or limited to a small volume relative to the total volume of the B-pillar 20. In the example embodiments, the volume of the localized soft zone or the total volume of the soft zones 30 together is less than the volume of the hard zone 32. The localized soft zones 30 allow the B-pillar 20 to be dimensional stable and fit well in body-in-white assemblies. The relatively small volume of the soft zones 30 also reduces the potential for distortion of the B-pillar 20 and thus the undesirable scrap.

In the example embodiment of FIG. 1, the B-pillar 20 includes four soft zones 30 which are separate and spaced from one another by portions of the hard zone 32. Each soft zone 30 is located along one of the side edges 22, 24 of the B-pillar 20. Two of the soft zones 30 are located along the bottom end 28, and the other two soft zones 30 are slightly above the bottom end 28, but still located in the lower half of the B-pillar 20. The top two soft zones 30 are longitudinally aligned, and the lower two soft zones 30 are longitudinally aligned.

Figure 2:
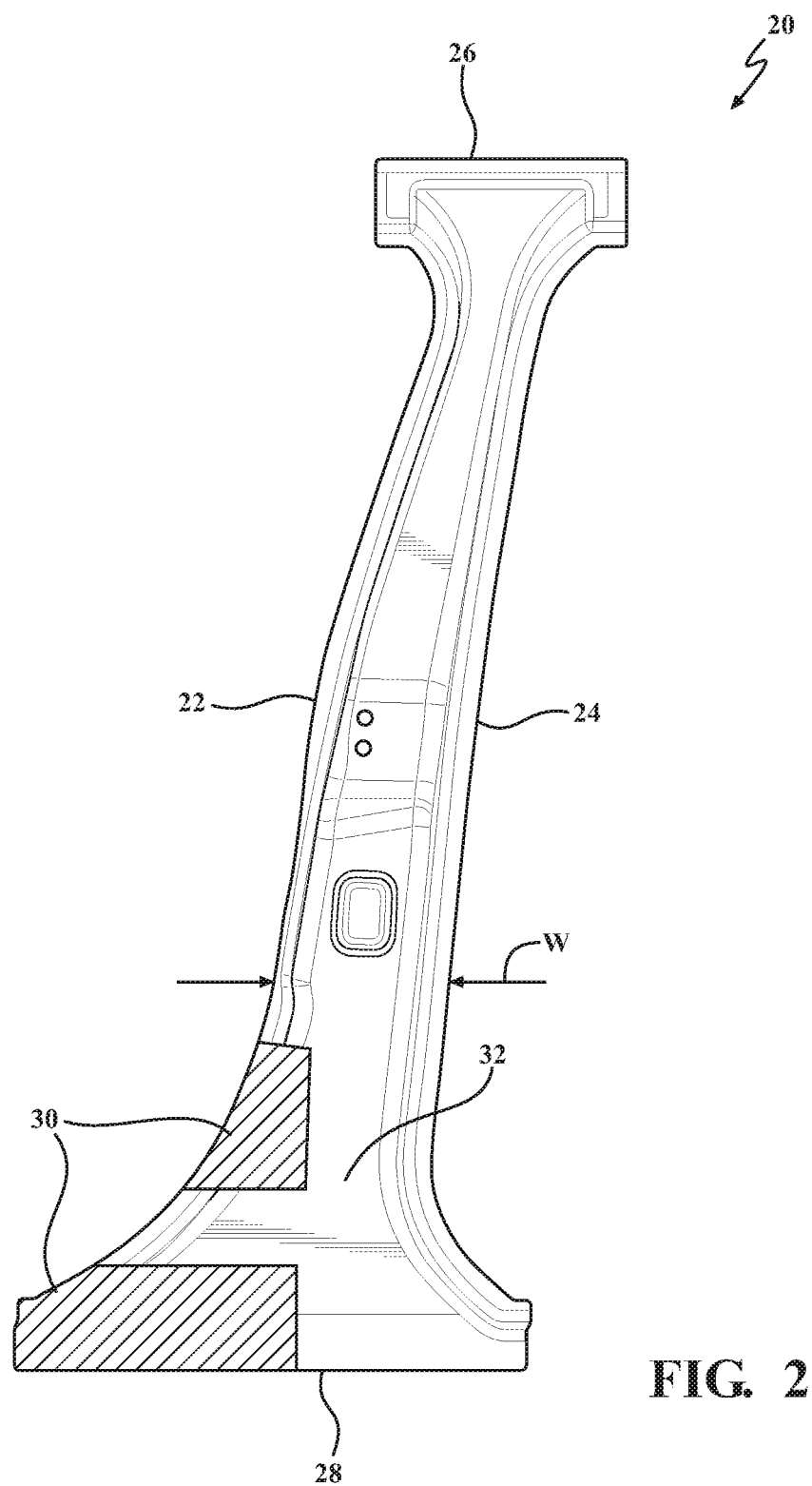

In the example embodiment of FIG. 2, the B-pillar 20 includes two soft zones 30 which are separate and spaced from one another by portions of the hard zone 32. Each soft zone 30 is located along the forward side edge 22. One of the soft zones 30 is located along the bottom end 28, and the other soft zone 30 is slightly above the bottom end 28, but still located in the lower half of the B-pillar 20.

Figure 3:
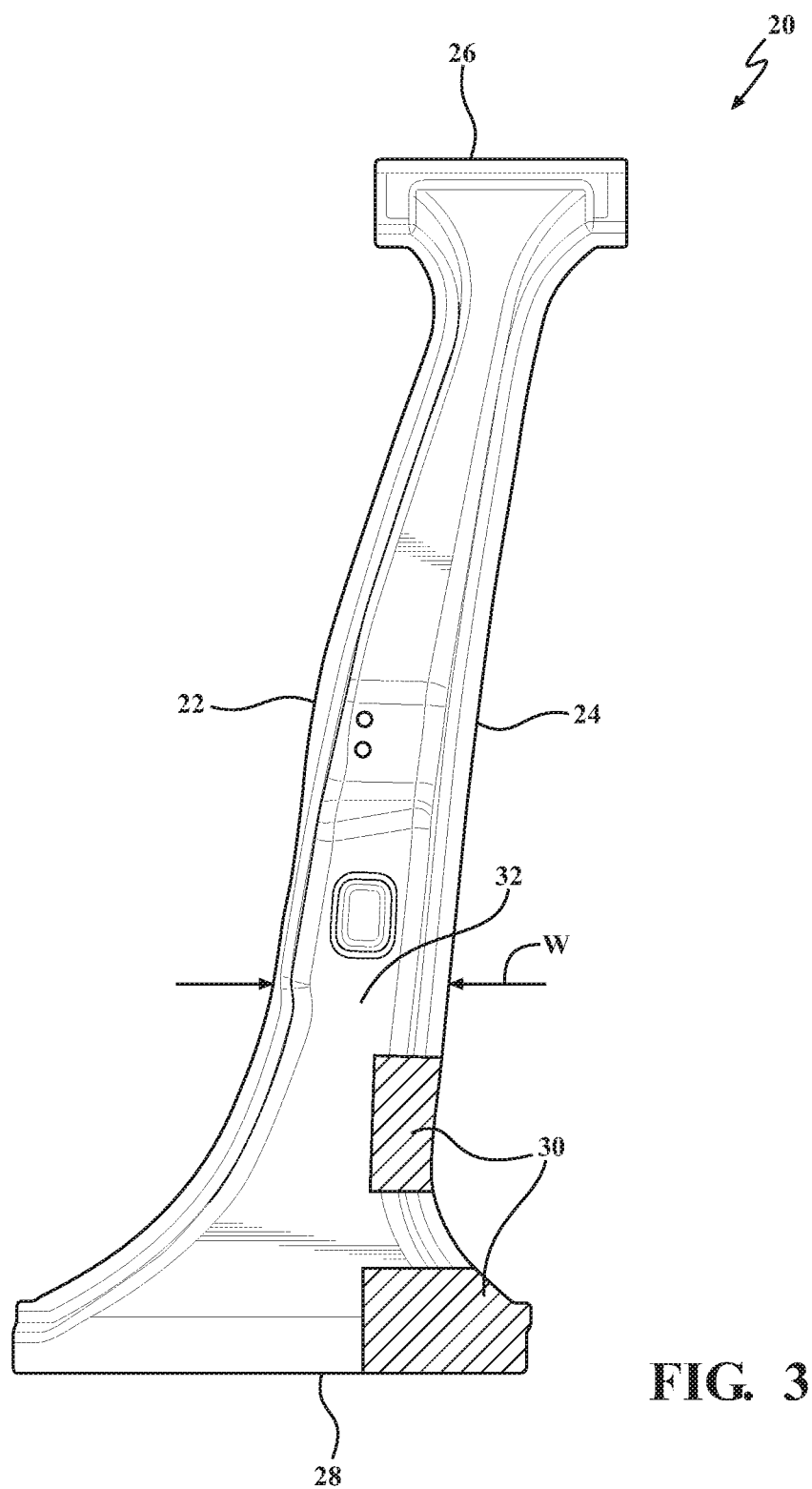

In the example embodiment of FIG. 3, the B-pillar 20 includes two soft zones 30 which are separate and spaced from one another by portions of the hard zone 32. Each soft zone 30 is located along the rear side edge 24. One of the soft zones 30 is located along the bottom end 28, and the other soft zone 30 is slightly above the bottom end 28, but still located in the lower half of the B-pillar 20.

Figure 4:
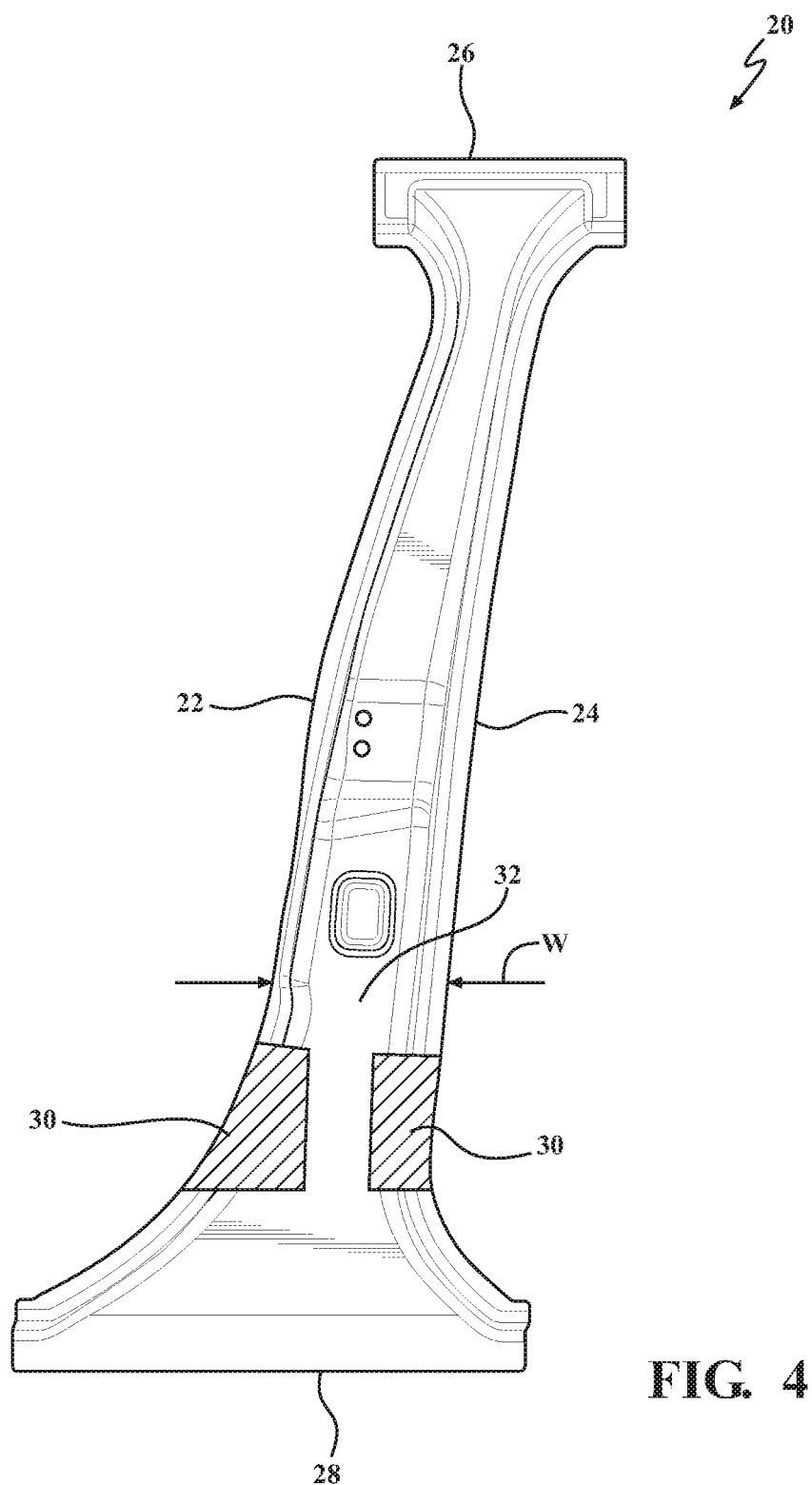

In the example embodiment of FIG. 4, the B-pillar 20 includes two soft zones 30 which are separate and spaced from one another by portions of the hard zone 32. One soft zone 30 is located along the forward side edge 22 and one is located along the rear side edge 24. Each soft zone 30 is slightly above the bottom end 28, but still in the lower half of the B-pillar 20. The two soft zones 30 are longitudinally aligned.

Figure 5:
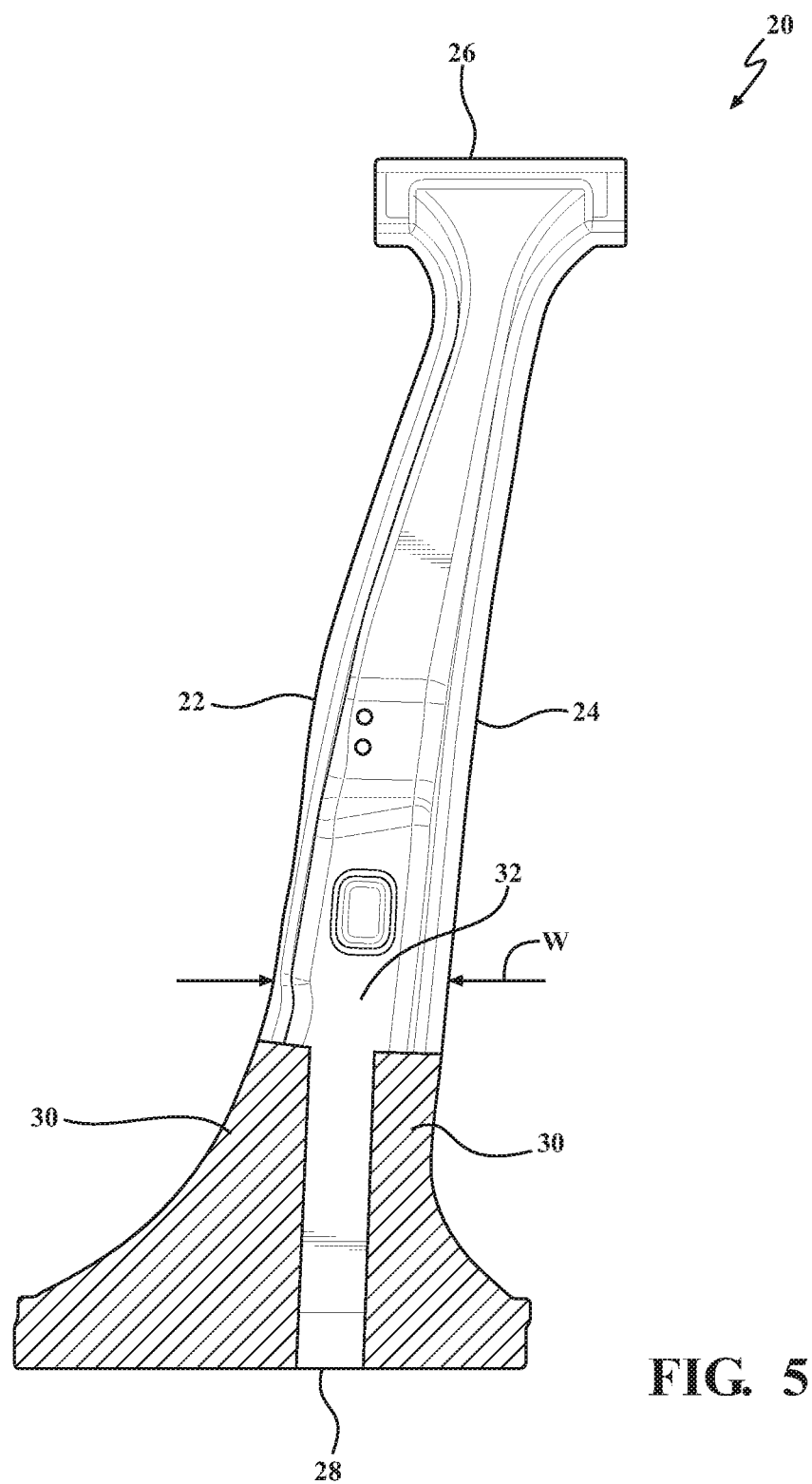

In the example embodiment of FIG. 5, the B-pillar 20 includes two soft zones 30 which are separate and spaced from one another by portions of the hard zone 32. One soft zone 30 is located along the forward side edge 22 and one is located along the rear side edge 24. Each soft zone 30 begins at the bottom end 28 and extends upward to encompass a larger portion of the B-pillar 20, compared to the soft zones 30 of FIG. 4. The two soft zones 30 of FIG. 5 are also longitudinally aligned.

Figure 6:
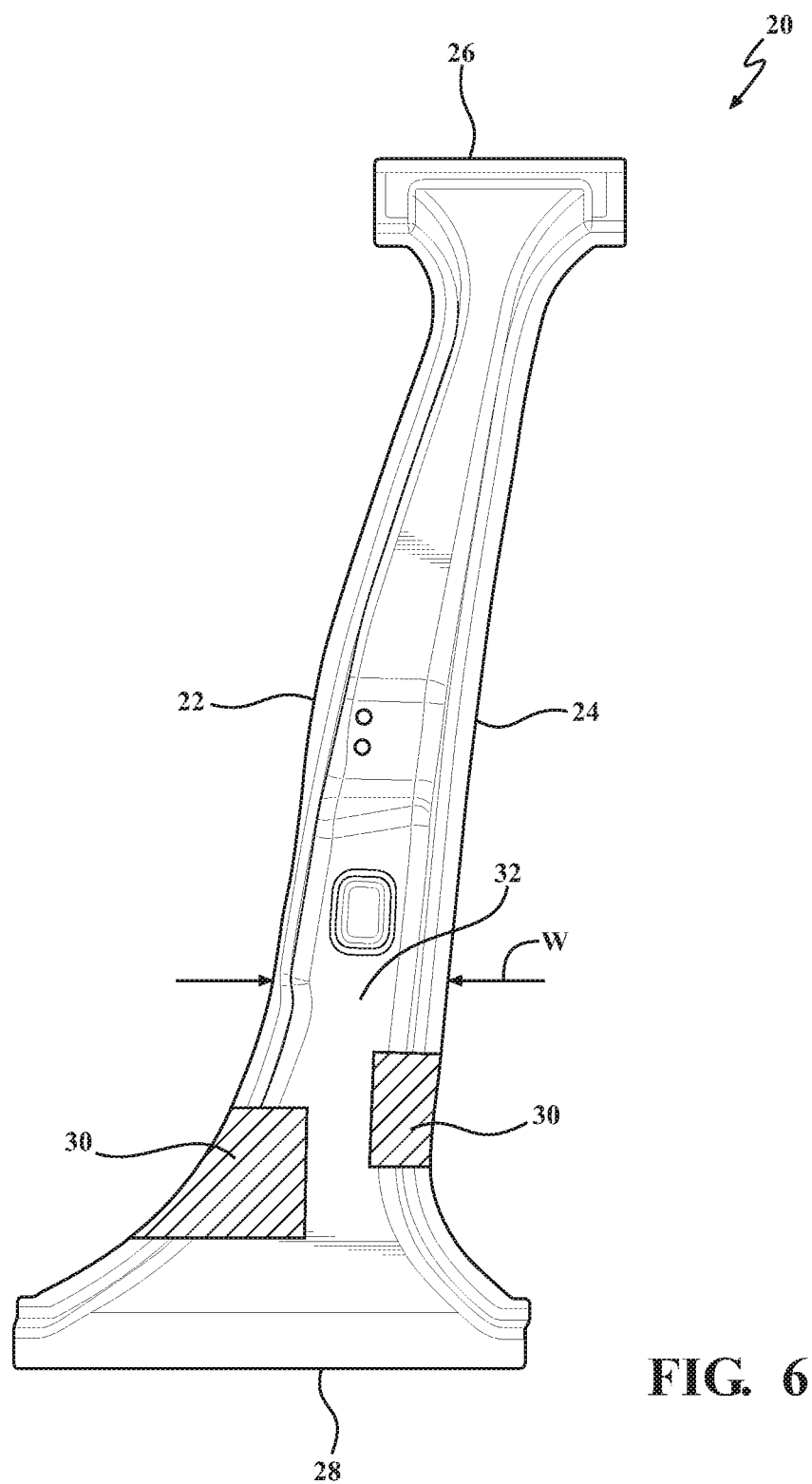

In the example embodiment of FIG. 6, the B-pillar 20 includes two soft zones 30 which are separate and spaced from one another by portions of the hard zone 32. One soft zone 30 is located along the forward side edge 22 and one is located along the rear side edge 24. Each soft zone 30 is slightly above the bottom end 28, but still in the lower half of the B-pillar 20. However, the soft zones 30 are not longitudinally aligned. The soft zone 30 located along the forward edge 22 is closer to the bottom end 28 of the B-pillar 20 than the soft zone 30 located along the rear edge 24.

Figure 7:
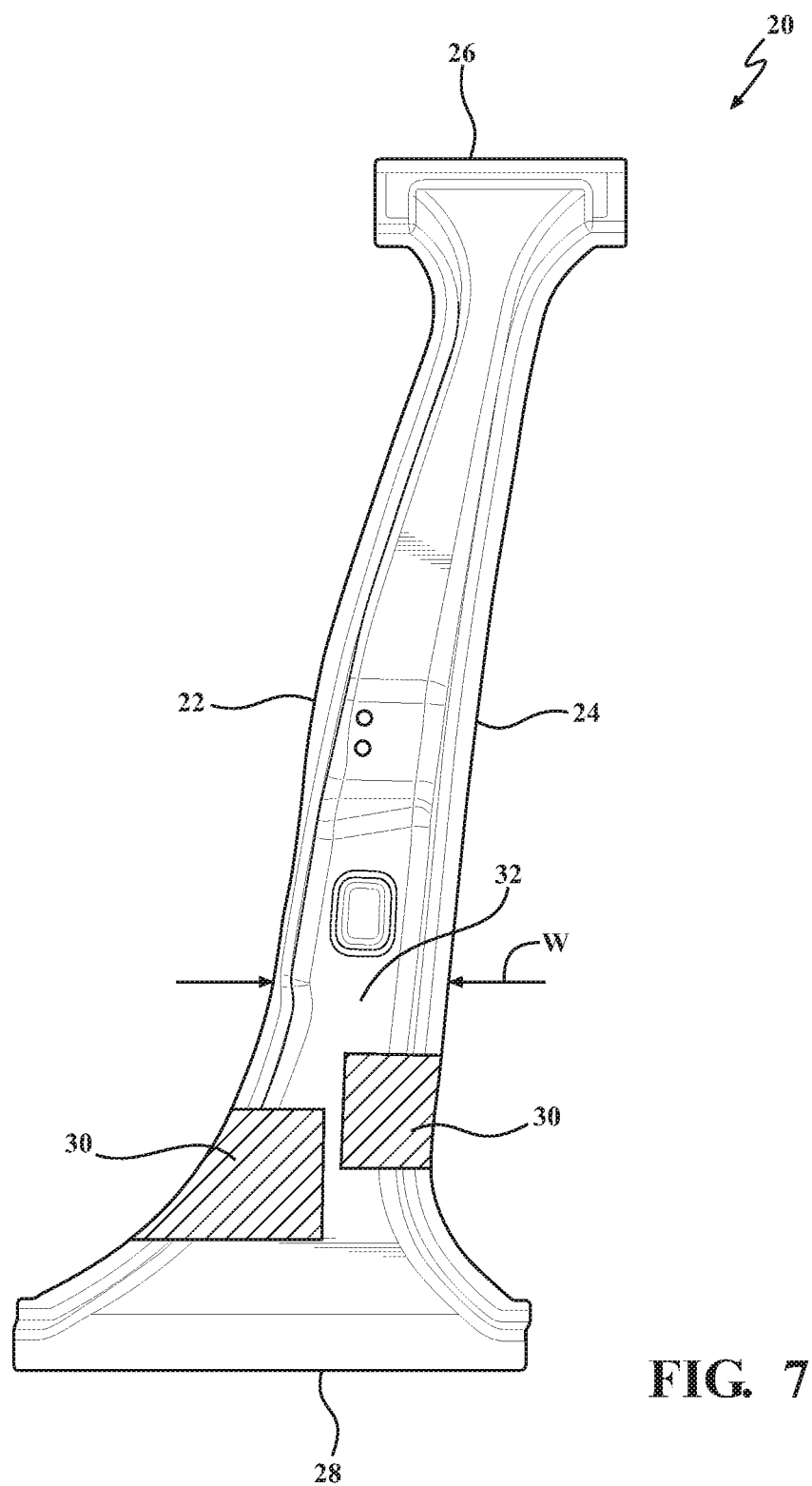

In the example embodiment of FIG. 7, the B-pillar 20 includes two soft zones 30 which are separate and spaced from one another by portions of the hard zone 32. One soft zone 30 is located along the forward side edge 22 and one is located along the rear side edge 24. Each soft zone 30 is slightly above the bottom end 28, but still in the lower half of the B-pillar 20. However, the soft zones 30 are not longitudinally aligned. The soft zone 30 located along the forward side edge 22 is closer to the bottom end 28 of the B-pillar 20 than the soft zone 30 located along the rear side edge 24. Also, the soft zones 30 of FIG. 7 are slightly larger than the soft zones 30 of FIG. 6.

The invention also provides a method of manufacturing the B-pillar 20. The method typically includes disposing a blank formed of the iron-based material in a die or between a pair of dies, and forming the blank into the shape of the B-pillar 20. Various different techniques can be used to form the localized soft zone(s) 30 surrounded by the hard zone 32. In general, the method typically includes heating the blank, and cooling the localized area(s) of the blank slower than the remaining area of the blank in a manner which forms the at least one localized soft zone 30 surrounded by the hard zone 32. The cooling of the area of the soft zones 30 can occur using a heated die or by air outside of the die. In other words, the blank does not need to be held between the dies during the cooling step, which reduces process cycle time and provides a more efficient process. The tooling or equipment used to form the B-pillar 20 can be simplified, since the blank used to form the B-pillar 20 can be removed from the dies anytime, and the soft zones 30 can be cooled by air. The slow cooling step has no effect on distortion of the B-pillar 20, and the amount of scrap caused by distortion of the B-pillar 20 can be reduced. Also, since the soft zones 30 are localized and comprise a smaller volume, the duration of the cooling step can be reduced.

According to one example embodiment, the method includes heating and cooling the blank in the die or dies, wherein at least one of the dies includes a heated section and a cooled section. The heating is maintained by heating elements, such as heated cartridges. The insulation between the heated section and cooled section in the die provides a barrier to attain small transition zones, which are typically >0<100 mm in size. The size of the typical transition zone is 30 to 60 mm. Heating of the blank in the die or between the pair of dies can be achieved by heated oil, infrared, induction, or other methods. The B-pillar 20 can also be post processed by using secondary operations to locally heat the areas of the soft zones 30. The medium used to conduct the post-softening step can be laser annealing, laser tempering, induction coils, conduction plates, infrared heating, or other methods. Lastly the in-die slow cooling rates can be maintained by creating no die contact in the area where the soft zones 30 are required. No contact can be achieved by local die modification so that there is gap between the die surface of the cooled section and the blank. For example, the localized areas of the blank can be spaced from the cooled section of the die to form the soft zones 30, and the remaining area of the blank can be located along the cooled section to form the hard zone 32.

Many modifications and variations of the present disclosure are possible in light of the above teachings and may be practiced otherwise than as specifically described while within the scope of the following claims.

What is claimed is:

1. A B-pillar for an automotive vehicle, comprising:
a component including a hard zone and a plurality of soft zones,
said soft zones having a volume less than a volume of said hard zone,
wherein said soft zones are spaced from one another by portions of said hard zone,
said microstructure of said hard zone is martensitic, and
said microstructure of said soft zones includes at least one of tempered martensite, ferrite, pearlite, bainite, austenite, and cementite.

2. The B-pillar of claim 1, wherein said hard zone has a higher yield strength and a higher tensile strength than said soft zones; and said hard zone has a lower elongation than said soft zones.

3. The B-pillar of claim 2, wherein said hard zone has a yield strength of 950 MPa to 1700 MPa and a tensile strength of 1200 MPa to 2100 MPa; and said soft zones have a yield strength of 340 MPa to 780 MPa and a tensile strength of 400 MPa to 980 MPa.

4. The B-pillar of claim 2, wherein said hard zone has an elongation of greater than 4% and said soft zones have an elongation of greater than 10%.

5. The B-pillar of claim 1, wherein said component is formed of steel, and said steel of said hard zone and said steel of said soft zones have different microstructures.

6. The B-pillar of claim 1, wherein said microstructure of said soft zones includes at least one of ferrite pearlite bainite, ferrite pearlite austenite, ferrite pearlite, ferrite bainite, cementite austenite, and cementite bainite.

7. The B-pillar of claim 1, wherein said component includes a forward side edge and a rear side edge each extending longitudinally from a top end to a bottom end,
   said component has a width extending from said forward size edge to said rear side edge,
   said width of said component varies between said top end and said bottom end,
   said hard zone has a higher yield strength and a higher tensile strength than said soft zones,
   said hard zone has a lower elongation than said soft zones,
   said hard zone has a yield strength of 950 MPa to 1700 MPa, a tensile strength of 1200 MPa to 2100 MP, and an elongation of greater than 4%,
   said soft zones each have a yield strength of 340 MPa to 780 MPa, a tensile strength of 400 MPa to 980 MPa, and an elongation of greater than 10%, and
   said component is formed of steel.

8. A method of manufacturing a B-pillar for an automotive vehicle, comprising the steps of:
   heating a blank, and
   cooling multiple areas of the blank at a slower rate than a remaining area of the blank to form soft zones and a hard zone, the soft zones having a volume less than a volume of the hard zone, the soft zones being spaced form one another by portions of the hard zone, the microstructure of the hard zone being martensitic, and the microstructure of the soft zones including at least one of tempered martensite, ferrite, pearlite, bainite, austenite, and cementite.

9. The method of claim 8, wherein the cooling step includes allowing air to cool the blank.

10. The method of claim 8, wherein the heating step is conducted by at least one die.

11. The method of claim 10, wherein the at least one die includes a cooling section, and the cooling step includes spacing the at least one area of the blank from the cooling section to form the soft zones.

12. The method of claim 10, wherein the heating step is conducted by heated oil, infrared heating, or induction heating.

13. The method of claim 8, wherein the heating step includes heating the at least one area of the blank by laser annealing, laser tempering, induction coils, conduction plates, or infrared heating.

14. The method of claim 8, wherein the hard zone has a higher yield strength and a higher tensile strength than the soft zones; and the hard zone has a lower elongation than the soft zones.

15. The method of claim 8, wherein the hard zone has a yield strength of 950 MPa to 1700 MPa and a tensile strength of 1200 MPa to 2100 MPa; the soft zones have a yield strength of 340 MPa to 780 MPa and a tensile strength of 400 MPa to 980 MPa; the hard zone has an elongation of greater than 4%; and the soft zones has an elongation of greater than 10%.

16. The method of claim 8, wherein the microstructure of the soft zones includes at least one of tempered martensite, ferrite pearlite bainite, ferrite pearlite austenite, ferrite pearlite, ferrite bainite, cementite austenite, and cementite bainite.

* * * * *